US009485965B2

(12) United States Patent
Bentley et al.

(10) Patent No.: US 9,485,965 B2
(45) Date of Patent: Nov. 8, 2016

(54) CANINE RESTRAINT HARNESS

(71) Applicant: EDISON NATION, LLC, Charlotte, NC (US)

(72) Inventors: Scott Anthony Bentley, Columbus, OH (US); Jeff Browning, Charlotte, NC (US); Raeshon Lamont McNeil, Charlotte, NC (US); Juan Carlos Perez, Charlotte, NC (US)

(73) Assignee: Scott Anthony Bentley, Columbus, OH (US)

( * ) Notice: Subject to any disclaimer, the term of this patent is extended or adjusted under 35 U.S.C. 154(b) by 0 days.

(21) Appl. No.: 14/158,823

(22) Filed: Jan. 18, 2014

(65) Prior Publication Data

US 2014/0202397 A1 Jul. 24, 2014

Related U.S. Application Data

(60) Provisional application No. 61/754,227, filed on Jan. 18, 2013.

(51) Int. Cl.
*A01K 27/00* (2006.01)

(52) U.S. Cl.
CPC .................................. *A01K 27/002* (2013.01)

(58) Field of Classification Search
CPC ........................... A01K 27/002; A01K 27/00
USPC .......................................... 191/863; 119/863
See application file for complete search history.

(56) References Cited

U.S. PATENT DOCUMENTS 3,769,939 A * 11/1973 Wais et al. .................... 119/856
4,964,369 A * 10/1990 Sporn .......................... 119/864
4,974,549 A * 12/1990 Gordon ........................ 119/793
5,325,819 A * 7/1994 Krauss ......................... 119/792
5,383,426 A * 1/1995 Krauss ......................... 119/793
5,471,953 A * 12/1995 Sporn .......................... 119/792
5,682,840 A * 11/1997 McFarland .................. 119/856
5,934,224 A * 8/1999 Sporn .......................... 119/792
6,085,694 A * 7/2000 Simon .......................... 119/792
8,100,090 B1 * 1/2012 Sutter .......................... 119/793
2012/0234261 A1 9/2012 Nelson

FOREIGN PATENT DOCUMENTS

EP 0555588 A2 12/1992
EP 0694255 A1 1/1996
EP 1809097 B1 8/2009
WO 2005117572 A1 12/2005

OTHER PUBLICATIONS

"No Pull Dog Harnesses" (http://www.petexpertise.com/no-pull-dog-harnesses.html), accessed on Nov. 19, 2013 (3 pages).
"ThunderLeash, A Simple No-Pull Solution for Your Dog!" (http://www.petexpertise.com/dog-collars-dog-harnesses/no-pull-dog-hamesses/thunderleash-no-pull-harness-leash.html), accessed on Nov. 19, 2013 (3 pages).

* cited by examiner

*Primary Examiner* — Kristen C Hayes
(74) *Attorney, Agent, or Firm* — Stanley Law Group LLP

(57) ABSTRACT

A canine restraint harness for controlling pulling behavior by a dog while being led includes a cord having first and second ends, a clasp for attachment to a dog collar, a cam for receiving and clamping a segment of the cord to reduce the length thereof, a closed loop at the clamped segment of the cord for attachment to a dog lead, and a fastener for fastening the first and second ends of the cord together. The cord is adapted to extend from the dog collar, between the front legs of the dog, and around the back of the dog to the dog lead such that the cam is disposed close to the back of the dog with the cord adapted to apply a tightening force when the dog exhibits pulling behavior while being led.

20 Claims, 11 Drawing Sheets

4 10 22 8 6 14 24 16 15 12 17

14

CANINE RESTRAINT HARNESS

CROSS REFERENCE TO RELATED APPLICATIONS

The present application is a U.S. non-provisional patent application of, and claims priority under 35 U.S.C. §119(e) to, U.S. provisional patent application Ser. No. 61/754,227, filed Jan. 18, 2013, which provisional patent application is expressly incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to canine restraints, and, in particular, to a canine restraint harness that discourages a dog from pulling while being walked on a lead.

2. Background

Many different kinds of dogs are commonly known to exhibit poor behavior when being led on a dog lead or leash. An untrained dog often has a prevailing tendency to "pull" or "tug" against the lead, often to the dog's own detriment. Excessive pulling or tugging can restrict the dog's air pathways and damage the trachea, as the collar presses into the dog's throat. Unfortunately, the collar alone is insufficient to discourage the dog from exhibiting this kind of behavior.

In response to this need, many different types of collars and harnesses have been developed to discourage poor behavior and encourage a dog not to pull or tug while being led. One example is a "choke collar" or "choke chain," which generally involves a length of chain or rope with a slipped loop at one end that loops around the dog's head. If the dog begins to pull, the loop is permitted to constrict tightly around the dog's neck, effectively "choking" the animal. Another example is a "prong collar" or "pinch collar," which utilize a series of blunted prongs to apply pressure around the dog's neck if the dog exhibits pulling behavior. Still another type of collar involves using a small electric shock when the dog exhibits pulling behavior.

In each case, a risk continues to exist that the dog may harm himself by pulling too hard or not responding to the stimulus in an efficient manner. Moreover, many consumers commonly consider these types of collars to be inhuman to the dog. Furthermore, for some dogs, these types of collars are ineffective at discouraging the very behaviors that they target.

As a result, a need exists for an improved type of restraint that addresses and corrects pulling behavior while dogs are being led, and does so in a more humane and effective manner. Furthermore, a need exists for an improved type of restraint that can be utilized in addressing and correcting pulling behavior in all different breeds, kinds and sizes of dogs. These, and other needs, are addressed by one or more aspects of the present invention.

SUMMARY OF THE PRESENT INVENTION

The present invention comprises a canine restraint harness. Broadly defined, the present invention according to one aspect includes a canine restraint harness for controlling pulling behavior by a dog while being led. The restraint harness includes a cord having first and second ends, a clasp for attachment to a dog collar, a cam for receiving and clamping a segment of the cord to reduce the length thereof, a closed loop at the clamped segment of the cord for attachment to a dog lead, and a fastener for fastening the first and second ends of the cord together. The cord is adapted to extend from the dog collar, between the front legs of the dog, and around the back of the dog to the dog lead such that the cam is disposed close to the back of the dog with the cord adapted to apply a tightening force when the dog exhibits pulling behavior while being led.

In a feature of this aspect, the fastener may include a male component disposed at the first end of the cord and a female component at a second end of the cord.

In other features of this aspect, the cam may be a locking cam capable of manipulation between a locked configuration and an unlocked configuration; the locking cam may be convertible between the locked and unlocked configuration by rotation of a locking switch; and/or the locking cam may include a pair of channels extending therethrough for receiving the segment of the cord.

In other features of this aspect, the locking cam may include a generally oblong-shaped barrel that clamps the cord against internal sides of the locking cam when the locking cam is in the locked configuration; each internal side of the locking cam may include a series of ridges; and/or the barrel may be manufactured from a metal material.

In another feature of this aspect, the cord may have a diameter measuring between approximately 2 mm and approximately 6.5 mm.

In another feature of this aspect, the cord may have a diameter measuring approximately 6.5 mm.

In other features of this aspect, the clasp may be capable of swiveling rotation; and/or the clasp may be disposed at a non-fixed position along the cord.

In other features of this aspect, the tightening force may pull downward at the neck of the dog; and/or the tightening force may press against the pits of the front legs of the dog.

Broadly defined, the present invention according to another aspect includes a canine restraint harness for controlling pulling behavior by a dog while being led. The restraint harness includes a cord having first and second ends, a clasp for attachment to a dog collar, a locking cam for receiving and clamping a segment of the cord to reduce the length thereof, a closed loop at the clamped segment of the cord for attachment to a dog lead, and a fastener for fastening the first and second ends of the cord together. The clasp is capable of swiveling rotation and is disposed at a non-fixed position along the cord. The locking cam includes a locking mechanism actuated between a locked configuration and an unlocked configuration by rotation of a locking switch. The cord is adapted to extend from the dog collar, between the front legs of the dog, and around the back of the dog to the dog lead such that the cam is disposed close to the back of the dog with the cord positioned against the pits of the front legs of the dog to apply pressure when the dog exhibits pulling behavior while being led.

In a feature of this aspect, the fastener may include a male component disposed at the first end of the cord and a female component at a second end of the cord.

In another feature of this aspect, the locking cam may include a pair of channels extending therethrough for receiving the segment of the cord.

In other features of this aspect, the locking cam may include a generally oblong-shaped barrel that clamps the cord against internal sides of the locking cam when the locking cam is in the locked configuration; each internal side of the locking cam may include a series of ridges; and/or the barrel may be manufactured from a metal material.

In another feature of this aspect, the cord may have a diameter measuring between approximately 2 mm and approximately 6.5 mm.

In another feature of this aspect, the cord may have a diameter measuring approximately 6.5 mm.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
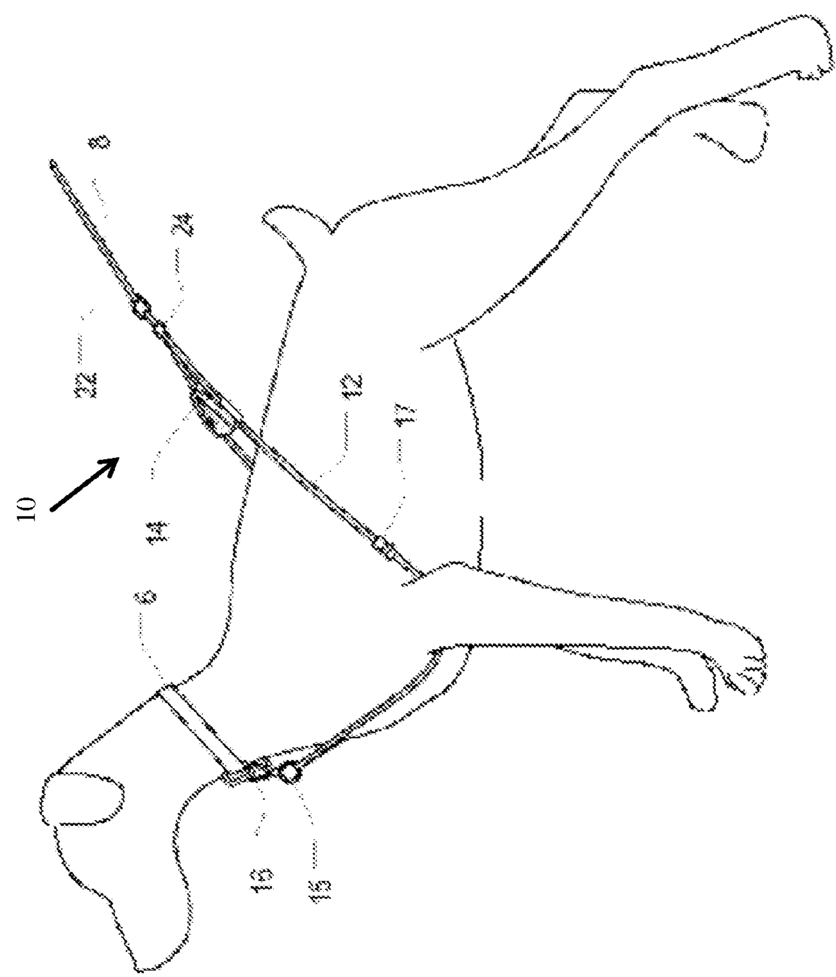
FIG. 1 is a side schematic view of a dog wearing a canine restraint harness in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
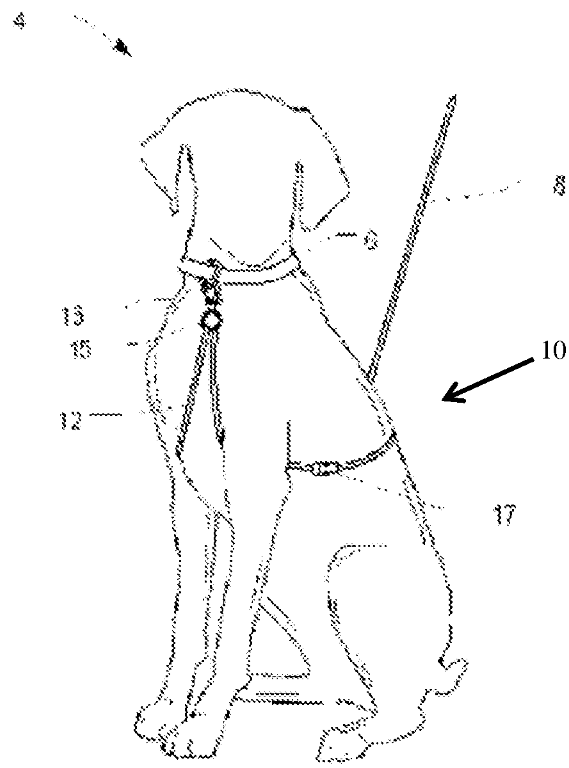
FIG. 2 is a front schematic view of the dog wearing the canine restraint harness of FIG. 1.

FIG. 1 is a side schematic view of a dog 4 wearing a canine restraint harness 10 in accordance with one or more preferred embodiments of the present invention, and FIG. 2 is a front schematic view of the dog 4 wearing the canine restraint harness 10 of FIG. 1. As shown in FIGS. 1 and 2, the canine restraint harness 10 includes a length of a cord 12 in combination with a pair of clasps 16,17, a pair of O-rings 15,22 and a locking cam 14. When in use, the canine restraint harness 10 is fitted against the dog 4 and is attached to each of a conventional dog collar 6 worn by the dog 4 and to a conventional dog lead 8, as will be explained in greater detail below. As used herein, the terms "dog" and "canine" are each intended to encompass all different kinds of dog breeds, types, and mixes, as well as dogs of all sizes.

Figure 3:
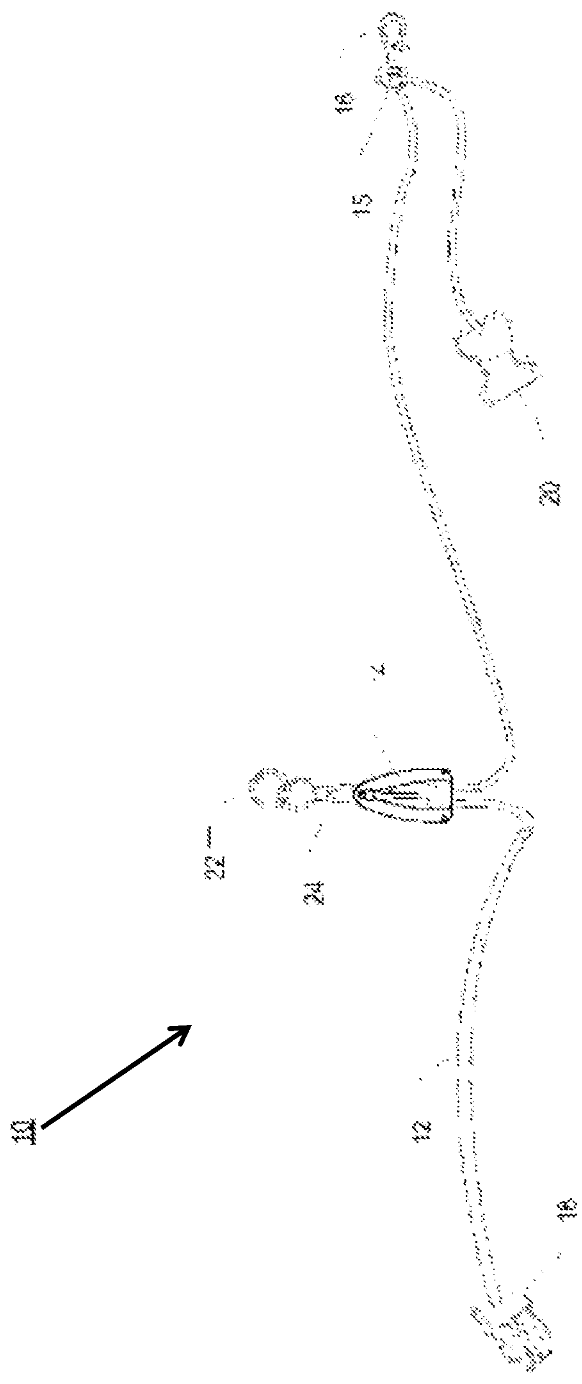
FIG. 3 is a top view of the canine restraint harness of FIG. 1.

FIG. 3 is a top view of the canine restraint harness 10 of FIG. 1 and provides a better view of the components that make up the canine restraint harness 10. The cord 12 of the canine restraint harness 10 is composed of a pliable, yet durable, material. In various contemplated embodiments, the cord 12 includes a polyester material or a nylon material, which, in either case, can be braided to form a sheath around a core material. It is further contemplated that any of a range of different materials that are capable of tolerating heavy pulling or tension is capable of being used as the cord 12 of the restraint harness 10. The diameter of the cord 12 can also vary across a range of different diameters. In contemplated embodiments, the diameter of the cord 12 measures between approximately 2 mm and approximately 6.5 mm, although cords with thicker diameters are also contemplated. In one contemplated embodiment, the cord 12 has a diameter measuring approximately 5 mm, and in another contemplated embodiment, the cord 12 has a diameter measuring approximately 6.5 mm. Conventional paracord, or parachute cord, is one particular kind of cord that is understood to be effective for use with the canine restraint harness 10. As shown in FIG. 3, a single length of the cord 12 is used for the canine restraint harness 10, although it is possible to use multiple separate lengths of the cord 12 as well.

As shown in FIG. 3, ends of the cord 12 of the canine restraint harness 10 are attached to male and female components 18,20 of a fastening clasp 17 (which can be seen in a fastened state in FIG. 2). The male and female components 18,20 of the fastening clasp 17 are fastenable together, thereby permitting the restraint harness 10 to be fastened to the dog 4. The cord 12 can be attached to the components 18,20 of the fastening clamp 17 by any of a range of different mechanisms. In one contemplated embodiment, one end of the cord 12 extends through an aperture in the male component 18, and the other end of the cord 12 extends through an aperture in the female component 20. Each end doubles back upon itself to form a small loop. A crimp (not shown), made of a durable material, such as a metal material, is then used to clamp each end tightly against the body of the cord 12, thereby closing the loop and attaching the components 18,20 of the fastening clasp 17 to the cord 12.

As previously mentioned, the canine restraint harness 10 also includes a pivoting clasp 16, which is used to fasten the restraint harness 10 to the collar 6 worn by the dog 4. The pivoting clasp 16 is pivotably attached to an O-ring 15 such that the pivoting clasp 16 is permitted to swivel freely relative to the O-ring 15. The cord 12 of the restraint harness 10 extends through the O-ring 15. By this means of attachment, the O-ring 15 (and the pivoting clasp 16 attached to the O-ring 15) is permitted to move freely along the length of the cord 12 between the fastening clasp 17 and the locking cam 14. The size of the O-ring 15 is sufficiently small so as to prevent either of the fastening clasp 17 or the locking cam 14 from passing through the O-ring 15. The pivoting quality of the pivoting clasp 16 helps reduce the possibility of the restraint harness 10 becoming twisted when worn by a dog.

Figure 4:
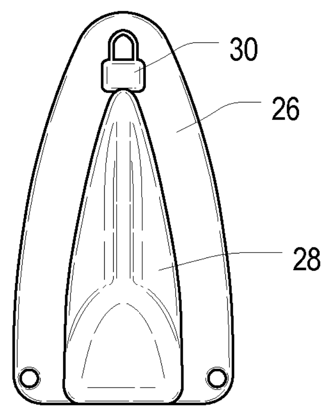
FIG. 4 is a top view of a locking cam of the canine restraint harness of FIG. 1.
Figure 5:
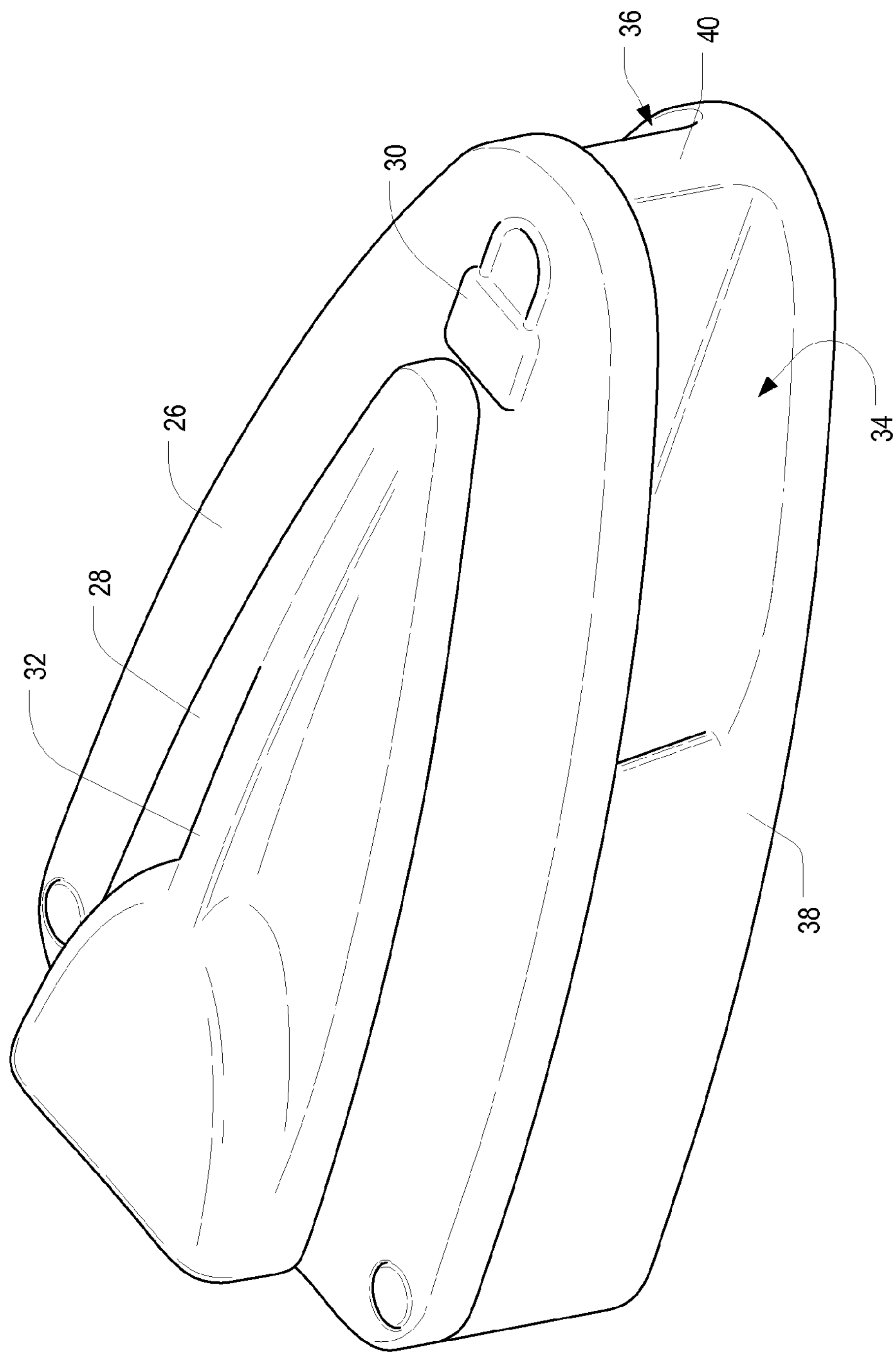
FIG. 5 is an orthogonal view of the locking cam of FIG. 4.

The canine restraint harness 10 further includes a locking cam 14 to facilitate loosening and tightening of the restraint harness 10 against the dog's body. FIG. 4 is a top view of a locking cam 14 of the canine restraint harness 10 of FIG. 1, and FIG. 5 is an orthogonal view of the locking cam 14 of FIG. 4. The locking cam 14 includes a locking mechanism 25 and a top cover 26 fastened atop a base 38. As perhaps best seen in FIGS. 3 and 5, the base 38 of the locking cam 14 defines a pair of channels 34,36, separated by a central divider 40, to accommodate the cord 12 of the restraint harness 10. In particular, the cord 12 extends fully through one channel 34 of the locking cam 14, doubles back upon itself, and extends back through the other channel 36 of the locking cam 14. When in an unlocked configuration, as explained in more detail below, the locking cam 14 permits the cord 12 to move freely through the channels 34,36, thereby allowing the user to add extra slack to the restraint harness 10 or to pull the restraint harness 10 taut against the dog 4.

Figure 6:
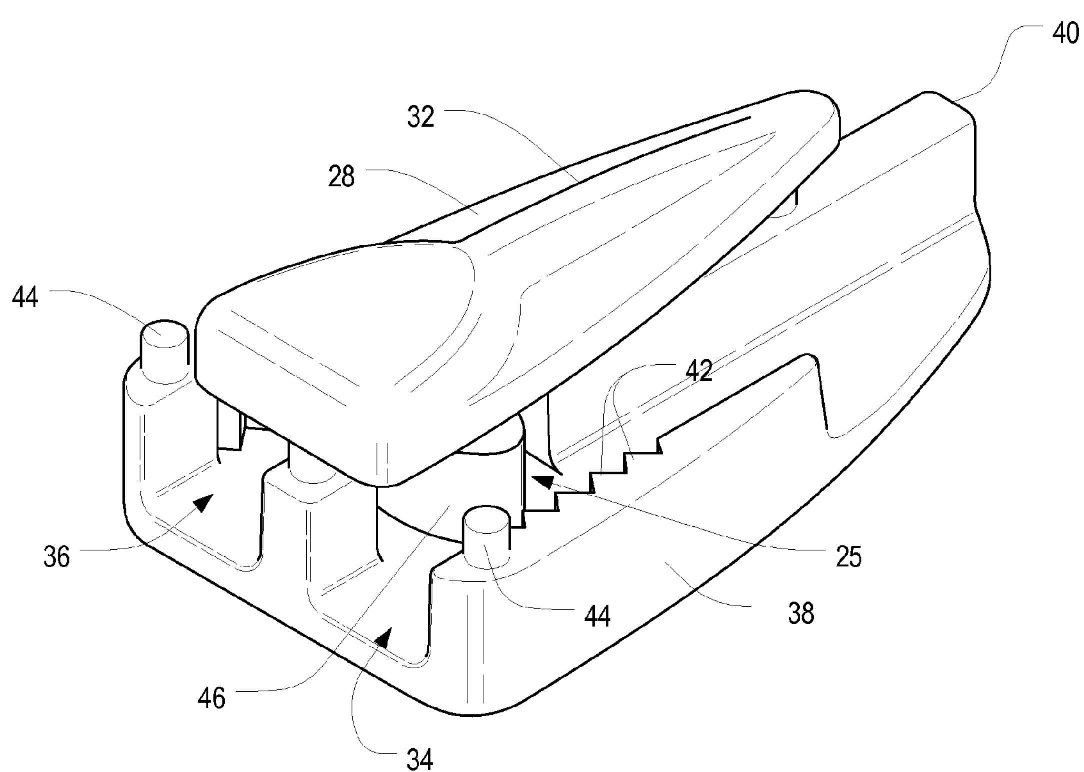
FIG. 6 is an orthogonal view of the locking cam of FIG. 4, shown with a top cover removed.

FIG. 6 is an orthogonal view of the locking cam 14 of FIG. 4, shown with a top cover 26 removed. With the top cover 26 removed, the locking mechanism 25 can be better understood. The locking mechanism 25 includes a locking switch 28 that is connected to a generally oblong-shaped barrel 46 housed between the top cover 26 and the base 38. The locking switch 28 has a generally triangular shape, corresponding generally with the shape of the locking cam 14, and a central spine 32 that is graspable by a user to rotate the locking switch 28. As can be seen in FIGS. 3-5, when the top cover 26 is attached to the base 38, the locking switch 28 is disposed above the top cover 26 and is readily accessible by a user. Further in this regard, the top cover 26 includes a lock designation 30 disposed thereon (having the general shape of a padlock) to indicate to a user that the locking cam 14 is in a locked configuration. In particular, when the locking switch 28 points to the lock designation 30, the locking cam 14 is in the locked configuration.

Figure 7:
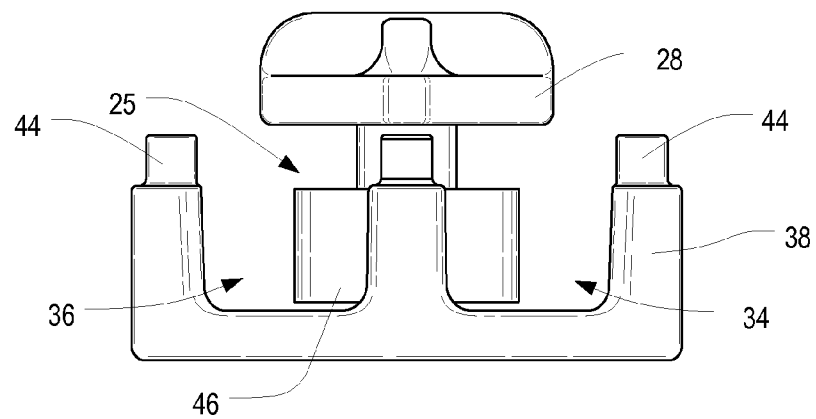
FIG. 7 is a rear view of the locking cam of FIG. 6, shown in a locked configuration.
Figure 8:
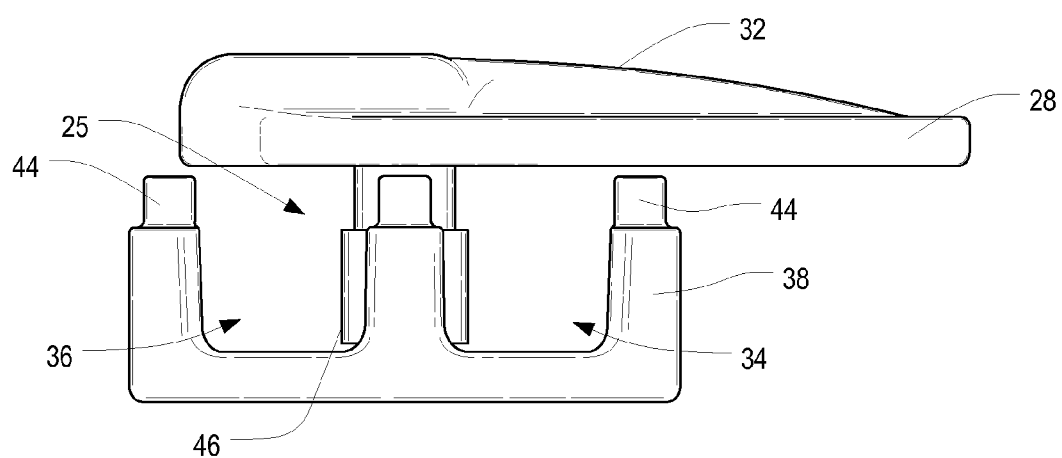
FIG. 8 is a rear view of the locking cam of FIG. 6, shown in an unlocked configuration.

At each side of the base 38 is a series of ridges 42 disposed along an internal face. The ridges 42 operate in connection with the barrel 46 of the locking cam 14 to firmly clamp the cord 12 when the locking cam 14 is in the locked configuration. In this regard, FIG. 7 is a rear view of the locking cam 14 of FIG. 6, shown in the locked configuration, and FIG. 8 is a rear view of the locking cam 14 of FIG. 6, shown in an unlocked configuration. As can be seen in FIG. 7, when the locking switch 28 is oriented to point toward the locking designation 30 on the top cover 26, the barrel 46 of the locking mechanism 25 is disposed with longer sides of the generally oblong-shaped barrel 46 pressing against the cord 12. In particular, longer sides of the barrel 46 reduce the size of the channels 34,36 and press the cord 12 firmly against the ridges 42 disposed at the sides of the base 38, thereby firmly clamping the cord into position and preventing the cord from moving freely through the channels 34,36 of the base 38. The ridges 42 disposed at sides of the base 38 create sufficient friction against the cord 12 to prevent the cord 12 from sliding through the channels 34,36, even when the cord 12 is under significant strain from a pulling dog.

As can be seen in FIG. 8, the locking switch 28 is capable of being rotated or pivoted, usually by about ninety degrees, so that the longer sides of the generally oblong-shaped barrel 46 are instead oriented lengthwise relative to the base 38 of the locking cam 14. In this regard, the size of the channels 34,36 is expanded and the cord 12 is no longer pressed against the series of ridges 42 at either side of the base 38. With the cord 12 permitted to move freely through the channels 34,36 of the locking cam 14, the canine restraint harness 10 is capable of being adjusted to fit the dog. Once adjusted, the locking switch 28 can be rotated or pivoted to point toward the locking designation 30 on the top cover 26, thereby re-locking the locking cam 14 and preventing the cord 12 from further movement relative to the locking cam 14.

As further shown in FIGS. 6-8, the base 38 includes a plurality of mounting posts 44 for aligning and fastening the top cover 26 to the base 38. The components that comprise the locking cam 14 can be manufactured from a wide range of different materials, including plastic and/or metal materials. In one contemplated embodiment, at least the barrel 46 of the locking cam 14 is manufactured from a metal material so as to be capable of withstanding repeated use and to enhance the performance of the locking capability of the locking cam 14 when used in connection with particularly strong or untrained dogs. It is further contemplated that the size of the various components of the locking cam 14, as well as the locking cam 14 itself, can be varied to accommodate cords having different thicknesses. In particular, the dimensions of the channels 34,36 of the base 38 and the dimensions of the barrel 46 should be sized to fittingly accommodate the cord 12 in such a way that the cord 12 can be effectively clamped when the locking cam 14 is in the locked configuration and the cord 12 can move freely when the locking cam 14 is in the unlocked configuration.

Returning to FIG. 3, the canine restraint harness 10 includes an O-ring 22 situated beyond an upper end of the locking cam 14. For purposes of this discussion, the locking cam 14 is referred to as having a particular orientation with the loose ends of the cord 12 extending from a "lower" end of the locking cam 14 and with the closed loop of the cord 12 extending from an "upper" end of the locking cam 14. Beyond the upper end of the locking cam 14, the cord 12 of the canine restraint harness 10 is pinched against itself and clamped with a crimp 24, thereby defining a small loop that is looped through the O-ring 22. In this regard, the position of the O-ring 22 is effectively fixed, and the O-ring 22 is prevented from moving freely along the length of the cord 12. Fixing the position of the O-ring 22 also enables the length of the cord 12 between the locking cam 14 and the crimp 24 to be the same for both segments. In so doing, the canine restraint harness 10 fits the dog 4 more evenly and the restraint harness 10 is capable of operating more effectively. A conventional dog lead 8 is attachable to the O-ring 22 to facilitate connection of the restraint harness 10 to the dog lead 8.

Figure 9:
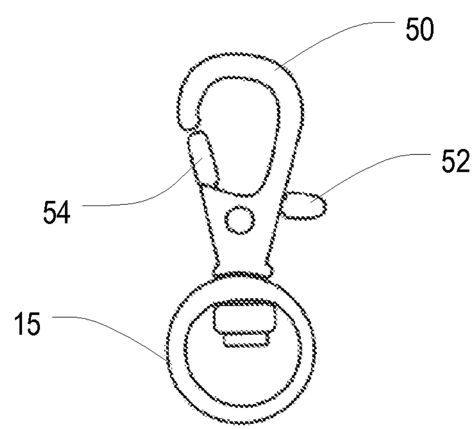
FIG. 9 is a top view of a pivoting clasp of the canine restraint harness of FIG. 1.

FIG. 9 is a top view of a pivoting clasp 16 of the canine restraint harness 10 of FIG. 1. As shown in FIG. 9, the pivoting clasp 16 is of conventional construction and includes a hooked portion 50, a lever 52, and a gate 54 actuated by the lever 52. When the canine restraint harness 10 is attached to a dog collar 6, the gate 54 can be opened by shifting the lever 52. With the gate open 54, the hooked portion 50 can be maneuvered to extend through a ringlet or other component of the dog collar 4. It is contemplated that the lever 52 can be spring-backed so that the gate 54 returns to a closed position when the lever 52 is released.

Figure 10:
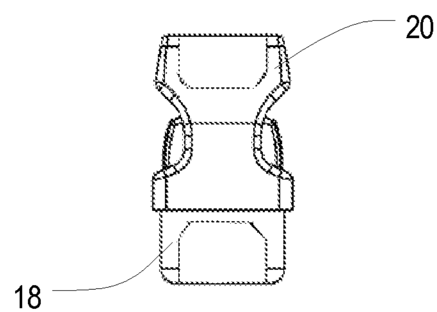
FIG. 10 is a top view of a fastening clasp of the canine restraint harness of FIG. 1.
Figure 11:
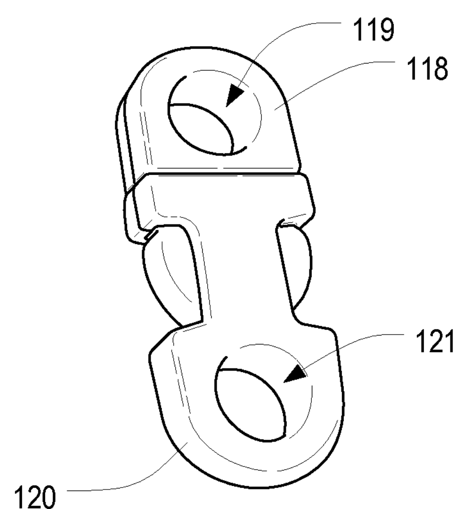
FIG. 11 is a perspective view of another fastening clasp for use in connection with the canine restraint harness of FIG. 1.

FIG. 10 is a top view of a fastening clasp 17 of the canine restraint harness 10 of FIG. 1. As discussed previously, the fastening clasp includes male and female components 18,20 disposed at opposite ends of the cord 12. When the canine restraint harness is fitted to a dog, the male and female components are snapped together to fasten the fastening clasp 17 and thereby fasten the restraint harness 10 to the dog. A wide variety of different shapes and configurations can be used for the components of the fastening clasp 17, provided that the components are capable of being fastened together. In this regard, FIG. 11 is a perspective view of another fastening clasp 117 for use in connection with the canine restraint harness 10 of FIG. 1. The fastening clasp 117 of FIG. 11 includes male and female components 118,120, each of which includes a respective aperture 119, 121 for accommodating the cord 12 of the canine restraint harness 10. Here, the circular shape of the apertures 119,121 can be useful in restricting the space that the cord 12 can move relative to the components 118,120 of the fastening clasp 117.

Returning to FIGS. 1 and 2, the canine restraint harness 10 is capable of being fit snugly to a range of different breeds and sizes of dogs. Generally, when worn by a dog 4, the pivoting clasp 16 is fastened to the dog's collar 6, usually above the dog's chest area, and the two ends of the cord 12 are brought downward and between the dog's front legs. The longer end of the cord 12 is brought over the dog's back and toward the shorter end of the cord 12 such that the male and female components of the fastening clasp 17 are brought together. The fact that the cord 12 can move freely relative to the pivoting clasp 16 enables the restraint harness 10 to be maneuvered to find the best fit for the dog. When the male and female components of the fastening clasp 17 are fastened together, the fastening clasp 17 is usually positioned at the dog's side and the locking cam 14 is situated above the dog's back, as seen in FIG. 1. The locking cam 14 is adjustable by unlocking the locking cam 14 and sliding the cord 12 through the channels 34,36 so that the locking cam 14 is positioned close to the dog's back. When slack in the cord 12 is eliminated as the locking cam 14 is tightened against the dog's back, the cord 12 is pulled taut against the pits of the dog's front legs, which is understood to be a particularly sensitive pressure spot for dogs. The dog's lead is attached to the O-ring 22 above the locking cam 14.

As the dog 4 is being led on a walk while wearing the canine restraint harness 10, pulling behavior by the dog 4 can be addressed and discouraged by compression of the restraint harness against the dog's chest. In particular, pulling behavior by the dog 4 causes the restraint harness 10 to become fully taut and pull against the pits of the dog's front legs. By applying pressure at this particularly sensitive area for dogs, the dog 4 responds by reducing or eliminating the behavior that causes the pressure. Furthermore, by adjusting the locking cam 14 close to the dog's back, the cord 12 is maintained snugly in position against the pits of the dog's front legs when the dog exhibits pulling behavior, thereby enhancing the effectiveness of the restraint harness 10 and sharpening the dog's response to correct the behavior.

Additionally, because the canine restraint harness 10 is attached to the dog's collar 6 by the pivoting clasp 16, pulling behavior by the dog 4 also creates a downward pull at the dog's neck, close to the jaw. In this regard, the harder that the dog 4 pulls against the lead, the harder the restraint harness 10 pulls downward at the collar 6, which results in the dog's head being lowered. Lowering of a dog's head is generally understood to be a submissive behavior for dogs and, as such, lowering of the dog's head while using the restraint harness 10 can also have the effect of reinforcing the dog's perception of the owner as being dominant. In another regard, the restraint harness 10 has the practical effect of redirecting the dog's poor behavior in pulling on the lead to becoming submissive behavior when the dog's head is lowered. Here again, by adjusting the locking cam 14 close to the dog's back, the cord 12 is maintained snugly in position against the dog's body, and the result of the dog's head being lowered by the restraint harness 10 is more immediate when the dog exhibits pulling behavior.

As can now be appreciated, the canine restraint harness 10 is capable of humanely facilitating quick corrective action by the dog. When the dog begins to pull or tug against the lead, the restraint harness 10 immediately responds to the behavior by applying pressure against the dog's chest—particularly at the pits of the dog's front legs—and simultaneously applying a downward pulling force against the dog's neck. Because the response is immediate, only a slight amount of pulling behavior is necessary to elicit responsive action by the dog. As a result, the dog is less likely to harm himself, as the pulling behavior has an increased opportunity of being corrected before the poor behavior gets out of control. Similarly, by pulling more or less against the lead, the restraint harness 10 enables the dog to learn how to control the amount of pressure and discomfort that he experiences.

The canine restraint harness 10 is capable of being used in connection with all breeds, kinds and sizes of dogs. It is contemplated that the length and diameter of the cord 12 may vary with the type and size of the dog. For instance, smaller dogs may require a shorter, thinner cord, and larger dogs may require a longer, thicker cord. It is contemplated that the cord 12 has a length measuring between approximately 27 inches and approximately 44 inches. In one contemplated embodiment, the cord 12 has a diameter measuring approximately 3 mm and a length measuring approximately 27 inches. In another contemplated embodiment, the cord 12 has a diameter measuring approximately 4 mm and a length measuring approximately 39 inches. In still another contemplated embodiment, the cord 12 has a diameter measuring approximately 5 mm and a length measuring approximately 44 inches. Similarly, it is contemplated that the canine restraint harness 10 is adapted for use in connection with any conventional dog collar or dog lead.

The canine restraint harness 10 may be equipped with aesthetically pleasing aspects to enhance its decorative appearance with certain types of dog collars and dog leads. For instance, it is contemplated that various components of the restraint harness 10 are covered or adorned with a leather finish. In one such contemplated embodiment, the crimp 24 adjacent the O-ring 22 is covered with a leather material. It is also contemplated that various components of the restraint harness have a particular color or finish. In one such contemplated embodiment, components such as the pivoting clasp 16 have a gold finish.

Figure 12:
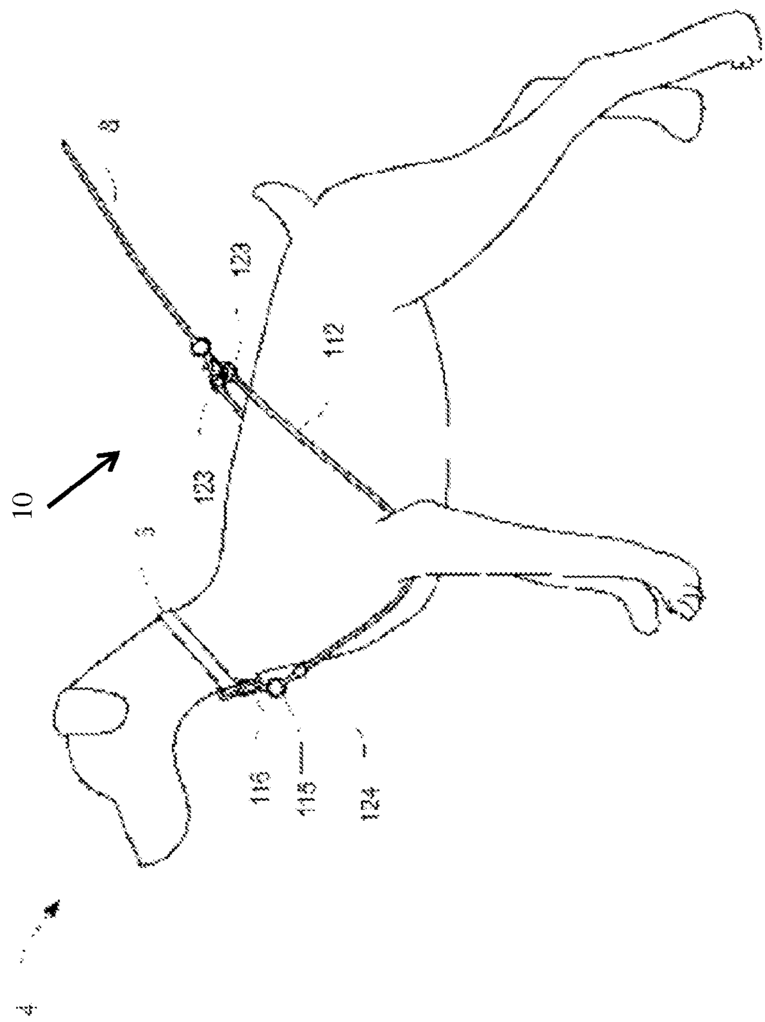
FIG. 12 is a side schematic view of a dog wearing another canine restraint harness in accordance with one or more preferred embodiments of the present invention.
Figure 13:
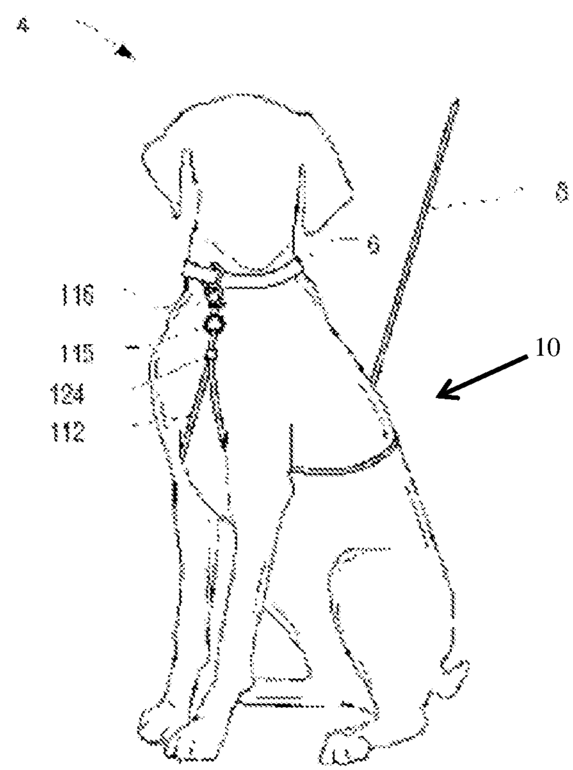
FIG. 13 is a front schematic view of the dog wearing the canine restraint harness of FIG. 12.

FIG. 12 is a side schematic view of a dog 4 wearing another canine restraint harness 110 in accordance with one or more preferred embodiments of the present invention, and FIG. 13 is a front schematic view of the dog 4 wearing the canine restraint harness 110 of FIG. 12. The canine restraint harness 110 of FIGS. 12 and 13 operates, in form and in function, in a manner similar to that of the canine restraint harness 10 of FIGS. 1-11. The canine restraint harness 10 includes a length of a cord 112 in combination with a clasp 116, a plurality of O-rings 115,123 and an adjustable stop 124. When in use, the canine restraint harness 110 is fitted against the dog 4 and is attached to each of a conventional dog collar 6 worn by the dog 4 and to a conventional dog lead 8.

The canine restraint harness 110 is capable of being fit snugly to a range of different breeds and sizes of dogs. Generally, when worn by a dog 4, the pivoting clasp 116 is fastened to the dog's collar 6, usually above the dog's chest area. The cord 112 extends through the O-ring 115, which is attached to the clasp 116. Ends of the cord 112, each of which is fitted with an O-ring 123, are brought downward and between the dog's front legs and toward the dog's back. In an alternative contemplated embodiment, the cord 112 may be comprised of two separate lengths, each of which is attached to the O-ring 115 at one end and to a separate O-ring 123 at the other end. In either case, the lead 8 is attached to both O-rings 123 to fasten the restraint harness 110 to the dog 4.

The canine restraint harness 110 includes an adjustable stop 124 disposed beneath the O-ring 115 of the clasp 116. The adjustable stop 124 is paired with each end of the cord 112 and is adjustable along the length of the cord 112 to clamp the ends of the cord 112 together at different locations. In this regard, the adjustable stop 124 permits the canine restraint harness 110 to be tailored to fit each dog individually.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A canine restraint harness for controlling pulling behavior by a dog while being led, the restraint harness comprising:

a cord having first and second ends;

a clasp for attachment to a dog collar, said clasp capable of swiveling rotation and disposed at a non-fixed position along the cord;

a cam for receiving and clamping a segment of the cord to reduce the length thereof;

a closed loop at the clamped segment of the cord for attachment to a dog lead; and a fastener for fastening the first and second ends of the cord together;

wherein the cord is adapted to extend from the dog collar, between the front legs of the dog, and around the back of the dog to the dog lead such that the cam is disposed close to the back of the dog with the cord adapted to apply a tightening force when the dog exhibits pulling behavior while being led.

2. The canine restraint harness of claim 1, wherein the fastener includes a male component disposed at the first end of the cord and a female component at a second end of the cord.

3. The canine restraint harness of claim 1, wherein the cam for receiving and clamping a segment of the cord is a locking cam capable of manipulation between a locked configuration and an unlocked configuration.

4. The canine restraint harness of claim 3, wherein the locking cam is convertible between the locked and unlocked configuration by rotation of a locking switch.

5. The canine restraint harness of claim 3, wherein the locking cam includes a pair of channels extending therethrough for receiving the segment of the cord.

6. The canine restraint harness of claim 3, wherein the locking cam includes a generally oblong-shaped barrel that clamps the cord against internal sides of the locking cam when the locking cam is in the locked configuration.

7. The canine restraint harness of claim 6, wherein each internal side of the locking cam includes a series of ridges.

8. The canine restraint harness of claim 6, wherein the barrel is manufactured from a metal material.

9. The canine restraint harness of claim 1, wherein the cord has a diameter measuring between approximately 2 mm and approximately 6.5 mm.

10. The canine restraint harness of claim 9, wherein the cord has a diameter measuring approximately 6.5 mm.

11. The canine restraint harness of claim 1, wherein the cord is further adapted such that a pulling force exerted against the closed loop of the cord causes a net downward force to be exerted at the dog collar against a neck of the dog.

12. The canine restraint harness of claim 1, wherein the cord is further adapted such that a pulling force exerted against the closed loop of the cord causes the harness to press against the pits of the front legs of the dog.

13. A canine restraint harness for controlling pulling behavior by a dog while being led, the restraint harness comprising:

a cord having first and second ends;

a clasp for attachment to a dog collar, the clasp being capable of swiveling rotation and being disposed at a non-fixed position along the cord;

a locking cam for receiving and clamping a segment of the cord to reduce the length thereof, the locking cam including a locking mechanism actuated between a locked configuration and an unlocked configuration by rotation of a locking switch;

a closed loop at the clamped segment of the cord for attachment to a dog lead; and a fastener for fastening the first and second ends of the cord together;

wherein the cord is adapted to extend from the dog collar, between the front legs of the dog, and around the back of the dog to the dog lead such that the cam is disposed close to the back of the dog with the cord positioned against the pits of the front legs of the dog to apply pressure when the dog exhibits pulling behavior while being led.

14. The canine restraint harness of claim 13, wherein the fastener includes a male component disposed at the first end of the cord and a female component at a second end of the cord.

15. The canine restraint harness of claim 13, wherein the locking cam includes a pair of channels extending therethrough for receiving the segment of the cord.

16. The canine restraint harness of claim 13, wherein the locking cam includes a generally oblong-shaped barrel that clamps the cord against internal sides of the locking cam when the locking cam is in the locked configuration.

17. The canine restraint harness of claim 16, wherein each internal side of the locking cam includes a series of ridges.

18. The canine restraint harness of claim 16, wherein the barrel is manufactured from a metal material.

19. The canine restraint harness of claim 13, wherein the cord is further adapted such that a pulling force exerted against the closed loop of the cord causes a net downward force to be exerted at the dog collar against a neck of the dog.

20. The canine restraint harness of claim 13, wherein the cord is further adapted such that a pulling force exerted against the closed loop of the cord causes the harness to press against the pits of the front legs of the dog.

* * * * *